United States Patent Office 2,741,604
Patented Apr. 10, 1956

2,741,604

PENICILLIN SALTS

Dale P. J. Goldsmith, Rahway, and Rae Taub, Metuchen, N. J., assignors to Merck & Co., Inc., Rahway, N. J., a corporation of New Jersey No Drawing. Application August 19, 1954,
Serial No. 451,052

2 Claims. (Cl. 260—239.1)

This invention relates to water-insoluble amine salts of penicillin. More particularly, it is concerned with novel penicillin salts of 6a,3a-diphenyltetrahydroimidaz-(d)-imidazole-2,5-(1H,3H)-diimine and methods of preparing the same.

Salts of penicillin which are stable and substantially insoluble in water, or only sparingly soluble in water, are useful in isolating and recovering penicillin from aqueous solutions. In addition, such nontoxic water insoluble salts are very valuable thereapeutically since on injection they exert a depot or repository effect, thereby maintaining desirable therapeutic levels of penicillin for prolonged periods.

It is an object of this invention to provide novel penicillin salts which are stable and substantially insoluble in water. It is a further object to provide novel amine salts of penicillin which exert a repository effect. Other objects will be apparent from the detailed description of the invention hereinafter provided.

In accordance with the present invention novel penicillin salts of 6a,3a-diphenyltetrahydroimidaz-(d)-imidazole-2,5-(1H,3H)-diimine are provided of the formula

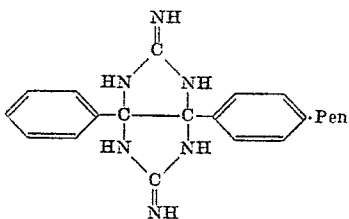

wherein Pen is a penicillin. Such penicillin amine salts are substantially insoluble in water and accordingly may be used for effecting the separation and isolation of a penicillin from aqueous solution, such as fermentation broths, or for the purpose of purifying a penicillin. Such compounds are also capable of exerting a depot effect when administered intramuscularly. In addition, such penicillin salts may be added to animal feedstuffs to increase the growth of animals, particularly poultry such as chickens and turkeys.

The novel penicillin salts of this invention are readily produced by reacting a penicillin with 6a,3a-diphenyltetrahydroimidaz-(d)-imidazole-2,5-(1H,3H)-diimine. This reaction may be conveniently effected according to one procedure by contacting the free base 6a,3a-diphenyltetrahydroimidaz-(d)-imidazole-2,5-(1H,3H)-diimine with a penicillin in the form of its free acid in the presence of an inert organic solvent. Some such inert solvents which may be used as the reaction medium are amyl acetate, ether, chloroform, butanol, propanol, isopropyl ether, and dioxane. The reaction is completed quickly at room temperature to produce the desired penicillin salt of 6a,3a-diphenyltetrahydroimidaz-(d)-imidazole-2,5-(1H,3H)-diimine. The product may be recovered from the reaction mixture by filtration if insoluble and if soluble, by evaporation of the reaction solvent.

The 6a,3a-diphenyltetrahydroimidaz-(d)-imidazole-2,5-(1H,3H)-diimine used in this reaction may be prepared by methods known to those skilled in the art. The penicillin used in the reaction may be any known penicillin such as penicillins G, F, X and the like and mixtures thereof. However, it is preferred to employ penicillin G since it is easily obtained commercially and is widely recognized for its efficaciousness.

In an alternative procedure, the novel penicillin salts of this invention may be conveniently produced by contacting a soluble salt of a penicillin with a soluble salt of 6a,3a-diphenyltetrahydroimidaz-(d)-imidazole-2,5-(1H,3H)-diimine in the presence of an aqueous reaction medium. Some salts of 6a,3a-diphenyltetrahydroimidaz-(d)-imidazole-2,5-(1H,3H)-diimine which are useful in this method are the soluble acid addition salts thereof such as the hydrochloride, sulfate and phosphate. Suitable penicillin salts which may be used in this reaction are the water soluble alkali metal, alkaline earth metal, ammonium and water soluble amine salts of penicillin. However, the alkali metal salts of penicillin are preferred. The reaction goes to completion quickly at room temperature. Recovery of the desired penicillin salt from the reaction mixture may be conveniently achieved by conventional methods such as filtration.

The penicillin salts of 6a,3a-diphenyltetrahydroimidaz-(d)-imidazole-2,5-(1H,3H)-diimine provided by this invention may contain from a minute fraction of a mole up to and including two moles of penicillin per mole of amine. Such salts are readily produced by employing the appropriate amount of penicillin in the reaction. Thus, by reacting two molar equivalents of penicillin with one molar equivalent of the amine a dipenicillin salt is formed. Similarly, by reacting one molar equivalent of amine with one molar equivalent of penicillin a mono-penicillin salt may be obtained.

The penicillin salts of 6a,3a-diphenyltetrahydroimidaz-(d)-imidazole-2,5-(1H,3H)-diimine are substantially insoluble in water and in this regard this specific di-penicillin G salt is less than 0.5% soluble in water at 25° C. This salt is also stable under the temperatures and conditions ordinarily encountered in the use of penicillin salts.

The following examples are included to further illustrate, but not limit, the practice of this invention.

EXAMPLE 1

*6a,3a-diphenyltetrahydroimidaz-(d)-imidazole-2,5-(1H,3H)-diimine dipenicillin salt*

0.584 gram of 6a,3a-diphenyltetrahydroimidaz-(d)-imidazole-2,5-(1H,3H)-diimine was dissolved in water containing 4 ml. of 1 N hydrochloric acid and the solution treated with 1.81 g. of potassium penicillin in a total of 50 ml. of water. A precipitate formed which was separated and slurried with methanol. The methanol insoluble material was recrystallized from acetone to give the 6a,3a-diphenyltetrahydroimidaz-(d)-imidazole-2,5-(1H,3H)-diimine dipenicillin salt containing 91.5% of the theoretical amount of penicillin for disalt by iodine assay. The product has a solubility in water of about 0.46% at 25° C.

The amine used in producing the penicillin salt was prepared as follows:

A mixture of 210.1 g. of benzil, 195.5 g. of guanidine nitrate and 106 g. of sodium carbonate in 400 ml. of isopropanol was refluxed at 80–83° C. for 8 hours with stirring. The mixture was then treated with 2 liters of water at 70° C. for one hour, cooled and filtered. The precipitate was slurried in 2800 ml. of water and dissolved by the addition of 120 ml. of 38% hydrochloric acid. After filtering, 58 ml. of 28% ammonium hydroxide was added until the pH was 8. The mixture was filtered and the filtrate cooled over night. After filtering, the solution was treated with 100 ml. of 30% sodium hydroxide. A precipitate of 6a,3a-diphenyltetrahydroimidaz-(d)-imidazole-2,5-(1H,3H)-diimine formed and was filtered, washed with water and recrystallized twice from ethanol-water; M. P. 235–236° C.

EXAMPLE 2

*6a,3a-diphenyltetrahydroimidaz-(d)-imidazole-2,5-(1H,3H)-diimine-penicillin*

0.584 gram of 6a,3a-diphenyltetrahydroimidaz-(d)-imidazole-2,5-(1H,3H)-diimine was dissolved in water containing 2 ml. of 1 N hydrochloric acid and treated with 0.82 g. of potassium penicillin in water. The resulting 6a,3a-diphenyltetrahydroimidaz-(d)-imidazole-2,5-(1H,3H)-diimine salt of penicillin precipitated. The product contained 62% of the theoretical amount of penicillin for the monosalt by iodine titration.

Various changes and modifications of the invention can be made and, to the extent that such variations incorporate the spirit of this invention, they are intended to be included within the scope of the appended claims.

What is claimed is:

1. A salt of a penicillin and 6a,3a-diphenyltetrahydroimidaz-(d)-imidazole-2,5-(1H,3H)-diimine.

2. A dipenicillin salt of 6a,3a-diphenyltetrahydroimidaz-(d)-imidazole-2,5-(1H,3H)-diimine.

UNITED STATES PATENTS

References Cited in the file of this patent

| | | |
|---|---|---|
| 2,631,146 | Weidenheimer et al. | Mar. 10, 1953 |
| 2,681,339 | Yamanaka et al. | June 5, 1954 |